United States Patent
Hirosawa

(10) Patent No.: US 8,497,969 B2
(45) Date of Patent: Jul. 30, 2013

(54) LIQUID CRYSTAL DISPLAY DEVICE HAVING PARTICULAR ELECTRODES

(75) Inventor: Jin Hirosawa, Saitama (JP)

(73) Assignee: Japan Display Central Inc., Saitama (JP)

( * ) Notice: Subject to any disclaimer, the term of this patent is extended or adjusted under 35 U.S.C. 154(b) by 19 days.

(21) Appl. No.: 13/303,606

(22) Filed: Nov. 23, 2011

(65) Prior Publication Data

US 2012/0069280 A1    Mar. 22, 2012

Related U.S. Application Data

(62) Division of application No. 12/369,656, filed on Feb. 11, 2009.

(30) Foreign Application Priority Data

Feb. 14, 2008    (JP) ................................ 2008-033437

(51) Int. Cl.
  *G02F 1/1343*   (2006.01)
  *G02F 1/1337*   (2006.01)

(52) U.S. Cl.
  USPC ............ 349/144; 349/146; 349/143; 349/123

(58) Field of Classification Search
  USPC .................................. 349/144, 146, 143, 123
  See application file for complete search history.

(56) References Cited

U.S. PATENT DOCUMENTS

| 6,924,863 | B2* | 8/2005 | Nishida et al. | 349/141 |
| 2001/0010575 | A1* | 8/2001 | Yoshida et al. | 349/141 |
| 2003/0020864 | A1* | 1/2003 | Yanagawa et al. | 349/155 |
| 2004/0165136 | A1 | 8/2004 | Sugiyama et al. | |
| 2005/0206824 | A1* | 9/2005 | Son et al. | 349/141 |
| 2005/0219453 | A1 | 10/2005 | Kubo et al. | |
| 2007/0115234 | A1 | 5/2007 | Kim et al. | |

(Continued)

FOREIGN PATENT DOCUMENTS

| JP | 06-222397 | 8/1994 |
| JP | 07-159807 | 6/1995 |

(Continued)

OTHER PUBLICATIONS

Official communication from Japanese Patent Office mailed May 18, 2010, issued in counterpart patent application No. 2008-033437.

(Continued)

Primary Examiner — Mike Qi

(74) Attorney, Agent, or Firm — Finnegan, Henderson, Farabow, Garrett & Dunner, LLP

(57) ABSTRACT

A liquid crystal display device includes an array substrate including a pixel electrode which is disposed in each of pixels, a counter-substrate which is disposed to be opposed to the array substrate and includes a counter-electrode which is common to a plurality of the pixels, and a liquid crystal layer which is held between the array substrate and the counter-substrate. The pixel electrode includes a first major electrode portion having a strip shape, and the counter-electrode includes second major electrode portions each having a strip shape, the second major electrode portions being disposed in parallel to the first major electrode portion in a manner that the first major electrode portion is interposed between the second major electrode portions and that the first major electrode portion and the second major electrode portions are alternately arranged.

12 Claims, 9 Drawing Sheets

U.S. PATENT DOCUMENTS

| | | |
|---|---|---|
| 2008/0062358 A1 | 3/2008 | Lee et al. |
| 2008/0180590 A1 | 7/2008 | Lee et al. |
| 2008/0180623 A1 | 7/2008 | Lee et al. |
| 2008/0186439 A1 | 8/2008 | Kwon et al. |
| 2013/0027643 A1* | 1/2013 | Hirosawa ................ 349/99 |
| 2013/0063692 A1* | 3/2013 | Kesho et al. ............ 349/143 |

FOREIGN PATENT DOCUMENTS

| | | |
|---|---|---|
| JP | 9-160041 | 6/1997 |
| JP | 9-160042 | 6/1997 |
| JP | 9-160061 | 6/1997 |
| JP | 10-026765 | 1/1998 |
| JP | 10-90708 | 4/1998 |
| JP | 2000-19558 | 1/2000 |
| JP | 2000-81641 | 3/2000 |
| JP | 2000-162602 | 6/2000 |
| JP | 2000-162639 | 6/2000 |
| JP | 2001-305565 | 10/2001 |
| JP | 2002-122841 | 4/2002 |
| JP | 2005-3802 | 1/2005 |
| JP | 3644653 | 2/2005 |
| JP | 2005-242307 | 9/2005 |
| JP | 2006-201814 | 8/2006 |

OTHER PUBLICATIONS

Official communication from Japanese Patent Office mailed Sep. 21, 2010, issued in counterpart patent application No. 2008-033437.

Official communication issued by Japan Patent Office, dated Jun. 19, 2012 for counterpart Japan Patent Application No. 2010-278122 (3 pages).

* cited by examiner

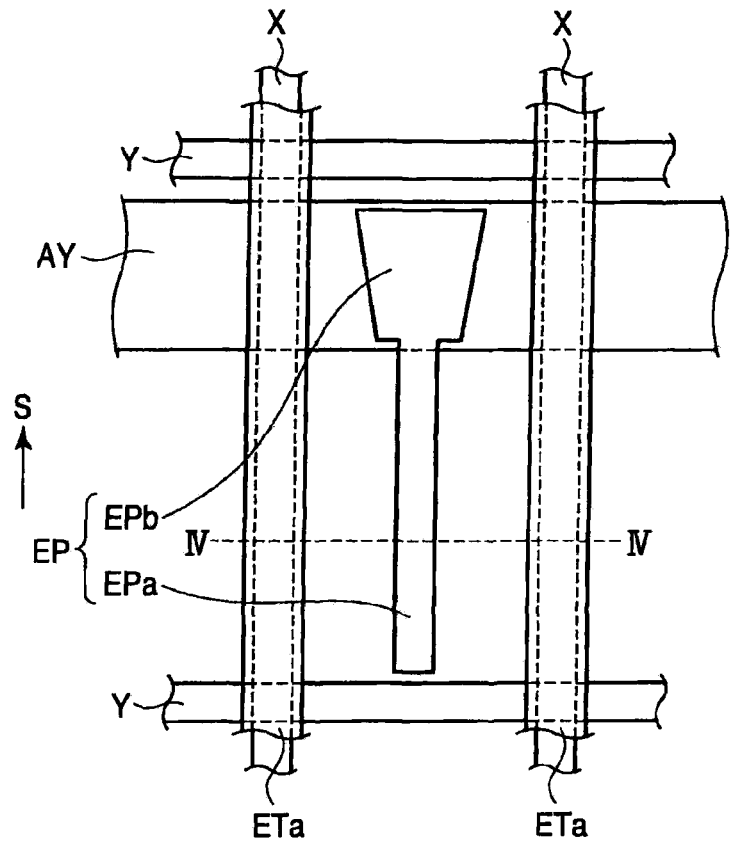
F I G. 3
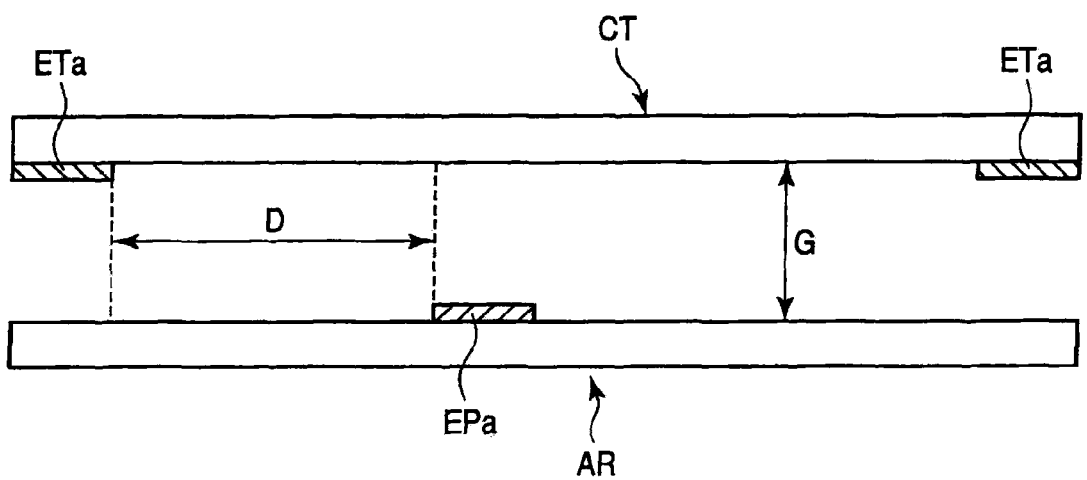
F I G. 4

| | Transmittance |
|---|---|
| Modification | 1.15 |
| Comparative example | 1.00 |

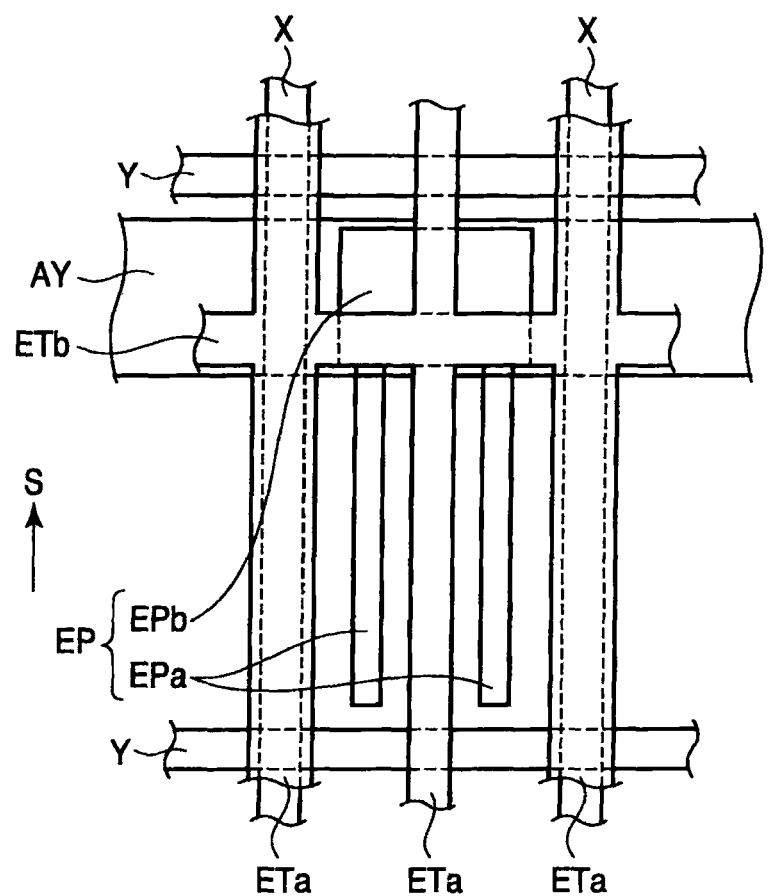
F I G. 13

LIQUID CRYSTAL DISPLAY DEVICE HAVING PARTICULAR ELECTRODES

CROSS-REFERENCE TO RELATED APPLICATIONS

This application is a divisional of application Ser. No. 12/369,656, filed Feb. 11, 2009, which is based upon and claims the benefit of priority from prior Japanese Patent Application No. 2008-033437, filed Feb. 14, 2008, the entire contents of which are incorporated herein by reference.

BACKGROUND OF THE INVENTION

1. Field of the Invention

The present invention relates generally to a liquid crystal display device, and more particularly to a liquid crystal display device which includes a pixel electrode on an array substrate, includes a counter-electrode on a counter-substrate, and generates a transverse electric field between the pixel electrode and the counter-electrode.

2. Description of the Related Art

In recent years, flat-panel display devices have vigorously been developed, and liquid crystal display devices attract particular attention by virtue of their advantages of light weight, small thickness and low power consumption. In particular, in an active matrix liquid crystal display device in which a switching element is provided in each of pixels, attention has been paid to the structure which makes use of a transverse electric field (including a fringe electric field), such as an IPS (In-Plane Switching) mode or an FFS (Fringe Field Switching) mode (see, for instance, Jpn. Pat. Appln. KOKAI Publication No. 2005-3802).

The liquid crystal display device of the IPS mode or FFS mode includes a pixel electrode and a counter-electrode, which are formed on an array substrate, and liquid crystal molecules are switched by a transverse electric field that is substantially parallel to the major surface of the array substrate. In addition, polarizer plates, which are disposed such that their axes of polarization intersect at right angles, are disposed on the outer surfaces of the array substrate and the counter-substrate. By this disposition of the polarizer plates, for instance, at a time of non-application of a voltage, a black screen is displayed, and with the application of a voltage corresponding to a video signal to the pixel electrode, the light transmittance (modulation ratio) gradually increases and a white screen is displayed. In this liquid crystal display device, the liquid crystal molecules rotate in a plane that is substantially parallel to the major surface of the substrate. Thus, since the polarization state is not greatly affected by the direction of incidence of transmissive light, there is the feature that the viewing angle dependency is low and a wide viewing angle characteristic is obtained.

A transverse-electric-field-mode liquid crystal display device having a pixel electrode and a counter-electrode on one of the substrates cannot be fabricated by using a conventional process of a vertical-electric-filed mode liquid crystal display device, such as a TN (Twisted Nematic) mode liquid crystal display device, which has a pixel electrode and a counter-electrode on different substrates. Thus, different manufacturing lines are needed, or the manufacturing line needs to be reassembled. This may cause an increase in manufacturing cost.

Furthermore, in the transverse-electric-field-mode liquid crystal display device, it is difficult to form an electric field, which is parallel to the major surface of the substrate, over the pixel electrode. Thus, compared to the vertical-electric-filed mode liquid crystal display device, the transmittance is lower.

BRIEF SUMMARY OF THE INVENTION

The present invention has been made in consideration of the above-described problems, and the object of the invention is to provide a liquid crystal display device which suppresses the manufacturing cost, has wide viewing angle characteristics, improves the transmittance, and has good display quality.

According to an aspect of the invention, there is provided a liquid crystal display device comprising: an array substrate including a pixel electrode which is disposed in each of pixels; a counter-substrate which is disposed to be opposed to the array substrate and includes a counter-electrode which is common to a plurality of the pixels; and a liquid crystal layer which is held between the array substrate and the counter-substrate, wherein the pixel electrode includes a first major electrode portion having a strip shape, and the counter-electrode includes second major electrode portions each having a strip shape, the second major electrode portions being disposed in parallel to the first major electrode portion in a manner that the first major electrode portion is interposed between the second major electrode portions and that the first major electrode portion and the second major electrode portions are alternately arranged.

The present invention can provide a liquid crystal display device which suppresses the manufacturing cost, has wide viewing angle characteristics, improves the transmittance, and has good display quality.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 3 is a plan view that schematically shows the structure of one pixel of the liquid crystal display device according to the embodiment;

FIG. 4 is a cross-sectional view of a liquid crystal display panel, taken along line IV-IV in FIG. 3;

FIG. 13 is a plan view that schematically shows the structure of one pixel of a liquid crystal display device which includes two first major electrode portions.

DETAILED DESCRIPTION OF THE INVENTION

A liquid crystal display device according to an embodiment of the present invention will now be described with reference to the accompanying drawings. In the description below, exemplification is made of a liquid crystal mode in which an array substrate includes a pixel electrode, a counter-substrate includes a counter-electrode, and liquid crystal molecules are switched by mainly using a transverse electric field which is formed between the pixel electrode and the counter-electrode (i.e. an electric field which is substantially parallel to the major surface of the array substrate).

Figure 1:
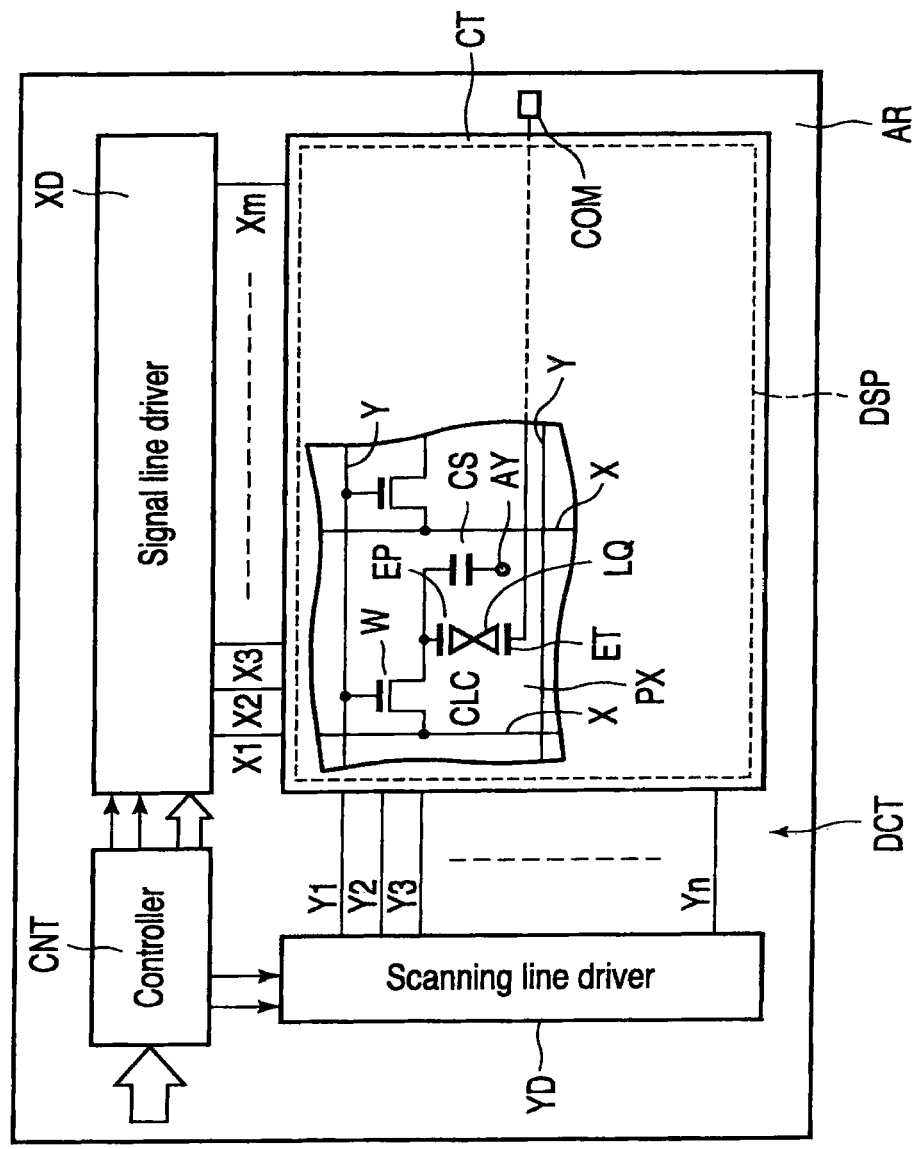
FIG. 1 schematically shows the structure of a liquid crystal display device according to an embodiment of the present invention, which is of a liquid crystal mode making use of a transverse electric field.
Figure 2:
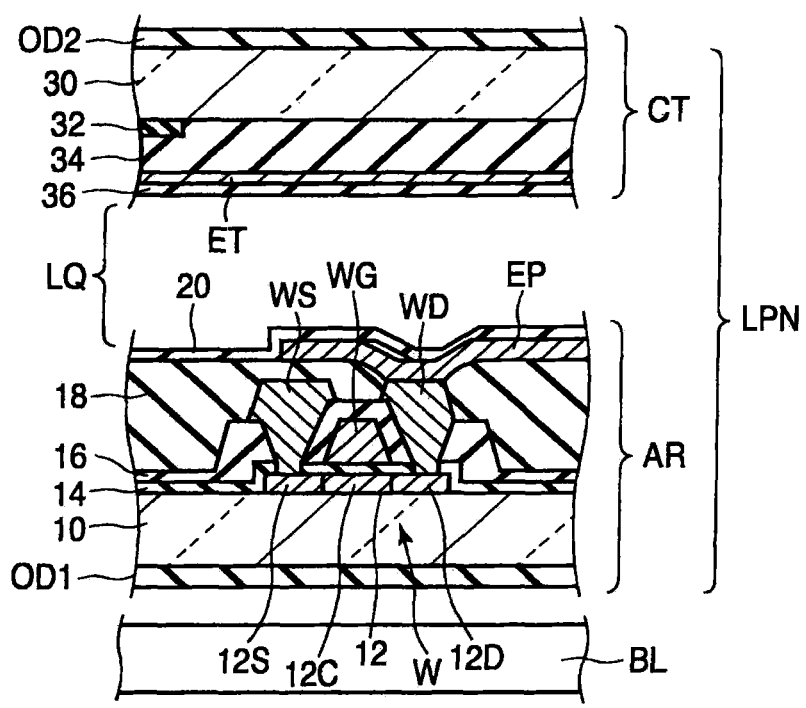
FIG. 2 is a cross-sectional view that schematically shows the structures of an array substrate and a counter-substrate, which are applied to the liquid crystal display device shown in FIG. 1.

As shown in FIG. 1, FIG. 2 and FIG. 3, the liquid crystal display device is an active matrix liquid crystal display device, and includes a liquid crystal display panel LPN. The liquid crystal display panel LPN includes a pair of substrates, namely, an array substrate AR and a counter-substrate CT which is disposed to be opposed to the array substrate AR.

Further, the liquid crystal display panel LPN includes a liquid crystal layer LQ which is held between the array substrate AR and the counter-substrate CT. This liquid crystal display device includes a display area DSP which displays an image. The display area DSP is composed of a plurality of pixels PX which are arrayed in a matrix of m×n.

The array substrate AR is formed by using an insulating substrate 10 with light transmissivity, such as a glass plate or a quartz plate. Specifically, the array substrate AR includes, in the display area DSP, an (m×n) number of pixel electrodes EP which are disposed in association with the respective color pixels PX; an n-number of scanning lines Y (Y1 to Yn) which extend in a row direction of the pixels PX; an m-number of signal lines X (X1 to Xm) which extend in a column direction of the pixels PX; an (m×n) number of switching elements W which are disposed in regions including intersections between the scanning lines Y and signal lines X in the respective pixels PX; and storage capacitance lines AY which are disposed in a manner to extend in the row direction, like the scanning lines Y, and are capacitive-coupled to the pixel electrodes EP so as to constitute storage capacitances CS in parallel with liquid crystal capacitances CLC.

The array substrate AR further includes, in a driving circuit region DCT around the display area DSP, at least a part of a scanning line driver YD which is connected to the n-number of scanning lines Y, and at least a part of a signal line driver XD which is connected to the m-number of signal lines X. The scanning line driver YD successively supplies a scanning signal (driving signal) to the n-number of scanning lines Y, based on the control by a controller CNT. The signal line driver XD supplies video signals (driving signals) to the m-number of signal lines X, based on the control by the controller CNT at a timing when the switching elements W of each row are turned on by the scanning signal. Thereby, the pixel electrodes EP of each row are set at pixel potentials corresponding to the video signals that are supplied via the associated switching elements W.

Each of the switching elements W is composed of, e.g. a thin-film transistor. A semiconductor layer 12 of the switching element W can be formed of, e.g. polysilicon or amorphous silicon. The semiconductor layer 12 includes a source region 12S and a drain region 12D, between which a channel region 12C is interposed. The semiconductor layer 12 is covered with a gate insulation film 14.

A gate electrode WG of the switching element W is connected to one associated scanning line Y (or formed integral with the scanning line Y), and is disposed, together with the scanning line Y and storage capacitance line AY, on the gate insulation film 14. The gate electrode WG, scanning line Y and storage capacitance line AY are covered with an interlayer insulation film 16.

A source electrode WS and a drain electrode WD of the switching element W are disposed on the interlayer insulation film 16 on both sides of the gate electrode WG. The source electrode WS is connected to one associated signal line X (or formed integral with the signal line X) and is put in contact with the source region 12S of the semiconductor layer 12. The drain electrode WD is connected to one associated pixel electrode EP (or formed integral with the pixel electrode EP) and is put in contact with the drain region 12D of the semiconductor layer 12. The source electrode WS, drain electrode WD and signal line X are covered with an organic insulation film 18.

The pixel electrode EP is disposed on the organic insulation film 18 and is electrically connected to the drain electrode WD via a contact hole which is formed in the organic insulation film 18. As shown in FIG. 3, the pixel electrode EP includes a first major electrode portion EPa and a first sub-electrode portion EPb. The first major electrode portion EPa has a strip shape, and is disposed linearly in parallel to the column direction. In this example, one first major electrode portion EPa is provided in each pixel PX, and is disposed at a central part of the pixel PX, that is, at a substantially equidistant position from the neighboring signal lines X. The first sub-electrode portion EPb is disposed to be opposed to the storage capacitance line AY.

The first major electrode portion EPa and first sub-electrode portion EPb, which constitute the pixel electrode EP, can be integrally formed of the same material, and, for example, can be formed of a light-transmissive, electrically conductive material, such as indium tin oxide (ITO) or indium zinc oxide (IZO). By forming the first major electrode portion EPa of the light-transmissive, electrically conductive material, light can pass through the first major electrode portion EPa and the transmittance can be improved.

The pixel electrodes EP of all pixels PX are covered with a first alignment film 20.

The scanning line Y and storage capacitance line AY are disposed substantially parallel, and can be formed of the same material. The storage capacitance line AY is disposed to be opposed to the pixel electrode EP via an insulation film such as the interlayer insulation film 16, and to cross the plural pixel electrodes EP. The signal line X is disposed to intersect substantially at right angles with the scanning line Y and storage capacitance line AY via the interlayer insulation film 16. The signal line X, scanning line Y and storage capacitance line AY are formed of an electrically conductive material, such as aluminum, molybdenum, tungsten, or titanium.

On the other hand, the counter-substrate CT is formed by using a light-transmissive insulating substrate 30 such as a glass plate or a quartz plate. Specifically, the counter-substrate CT includes a counter-electrode ET in the display region DSP, which is common to the plural pixels PX. The counter-electrode ET is electrically connected to a common wiring line COM to which a common potential is supplied, outside the display region DSP.

As shown in FIG. 3, the counter-electrode ET includes second major electrode portions ETa. The second major electrode portions ETa have strip shapes and are disposed linearly in parallel to the column direction over the entire display area DSP. In this example, neighboring second major electrode portions ETa sandwich one first major electrode portion EPa, and are disposed at a substantially equidistant position from the first major electrode portion EPa.

In addition, in the example shown in FIG. 3, the second major electrode portions ETa are disposed to be opposed to the signal lines X.

As shown in FIG. 4, the second major electrode portions ETa and the first major electrode portion EPa are alternately disposed in parallel so that a transverse electric field is formed between each of the second major electrode portions ETa and the first major electrode portion EPa. Specifically, the second major electrode portion ETa is disposed so as not to be opposed to the first major electrode portion EPa. The first major electrode portions EPa and second major electrode portions ETa have a combtooth pattern. FIG. 4 depicts only a main part that is necessary for the description.

The second major electrode portions ETa, which constitute the counter-electrode ET, can be formed of a light-transmissive, electrically conductive material such as ITO. By forming the second major electrode portion ETa of the light-transmissive, electrically conductive material, light can pass through the second major electrode portion ETa and the transmittance can be improved.

The counter-electrode ET is covered with a second alignment film 36.

The liquid crystal display device of a color display type includes a color filter layer 34 which is provided on the inner surface of the liquid crystal display panel LPN in association with each pixel PX. In the example shown in FIG. 2, the color filter layer 34 is provided on the counter-substrate CT. The color filter layer 34 is formed of color resins of a plurality of different colors, for example, the three primary colors of red, blue and green. The red color resin, blue color resin and green color resin are disposed in association with a red pixel, a blue pixel and a green pixel, respectively.

In the example of the color-display-type liquid crystal display device as shown in FIG. 2, the color filter layer 34 is disposed on the counter-substrate CT side. However, the color filter layer 34 may be disposed on the array substrate AR side.

The respective pixels PX are partitioned by a black matrix 32. The black matrix 32 is formed of, e.g. a black color resin, and is disposed to be opposed to the scanning lines Y, signal lines X and wiring portions of the switching elements W, etc., which are provided on the array substrate AR. In the color-display-type liquid crystal display device, the color filter 34 is disposed in each of the regions which are partitioned by the black matrix 32.

The counter-substrate CT may be configured to include a shield electrode for reducing the influence of external electric field, and an overcoat layer which is disposed with such a relatively large thickness as to reduce irregularities on the surface of the color filter layer 34.

When the counter-substrate CT and the above-described array substrate AR are disposed such that their first alignment film 20 and second alignment film 36 are opposed, a predetermined gap is provided by spacers (not shown), which are disposed between both alignment films 20 and 36. The liquid crystal layer LQ is composed of a liquid crystal composition including liquid crystal molecules, which is sealed in the gap between the first alignment film 20 of the array substrate AR and the second alignment film 36 of the counter-substrate CT.

The liquid crystal molecules included in the liquid crystal layer LQ are aligned by restriction forces that are caused by the first alignment film 20 and second alignment film 36. Specifically, at a time of no electric field, that is, when there is no potential difference between the potential of the pixel electrode EP and the potential of the counter-electrode ET (i.e. when no electric field is generated between the pixel electrode EP and the counter-electrode ET), the liquid crystal molecules are aligned such that their major-axis direction is parallel to a rubbing direction S of the alignment film 20 and alignment film 36. The rubbing direction S, as shown in FIG. 3, is, for example, parallel to the column direction on the major surface of the array substrate AR.

The liquid crystal display device includes an optical element OD1 which is provided on one of outer surfaces of the liquid crystal display panel LPN (i.e. that surface of the array substrate AR, which is opposite to the surface thereof that is in contact with the liquid crystal layer LQ), and an optical element OD2 which is provided on the other outer surface of the liquid crystal display panel LPN (i.e. that surface of the counter-substrate CT, which is opposite to the surface thereof that is in contact with the liquid crystal layer LQ). Each of the optical elements OD1 and OD2 includes a polarizer plate, thereby realizing, for example, a normally black mode in which the transmittance of the liquid crystal panel LPN decreases to a minimum (i.e. a black screen is displayed) at the time of no electric field.

Further, the liquid crystal display device includes a backlight unit BL which is disposed on the array substrate AR side of the liquid crystal display panel LPN.

In this liquid crystal display device, when a potential difference is produced between the potential of the pixel electrode EP and the potential of the counter-electrode ET (i.e. at a voltage application time when a voltage of a potential that is different from the potential of the counter-electrode ET is applied to the pixel electrode EP), a transverse electric field E1 is generated between the first major electrode portion EPa of the pixel electrode EP and the second major electrode portion ETa of the counter-electrode ET.

In this case, the distance D between the first major electrode portion EPa and the second major electrode portion ETa is set to be sufficiently great, compared to the gap G between the substrates. For example, the distance D is about 10 μm or more (preferably 10 to 15 μm) and the gap G is about 4 μm. Thus, a transverse electric field E1, which is substantially parallel to the substrate major surface and is substantially horizontal, is formed between the first major electrode portion EPa and the second major electrode portion ETa. The distance D, in this context, is a distance between an edge of the first major electrode portion EPa on the second major electrode portion ETa side and an edge of the second major electrode portion ETa on the first major electrode portion EPa side. The gap G is a gap between the first alignment film 20 and the second alignment film 36.

At this time, the liquid crystal molecule is driven such that its major-axis direction is oriented from the rubbing direction S to a direction parallel to the transverse electric field E1. If the major-axis direction of the liquid crystal molecule varies from the rubbing direction S, the modulation ratio relating to the light passing through the liquid crystal layer LQ varies. Accordingly, backlight is selectively passed in accordance with the modulation ratio, and an image is displayed.

The liquid crystal mode, which makes use of the transverse electric field, is thus realized.

In the liquid crystal display device, the pixel electrode EP is formed on the array substrate AR, and the counter-electrode ET is formed on the counter-substrate CT. Thus, the fabrication step of forming the pixel electrode EP on the array substrate AR and the fabrication step of forming the counter-electrode ET on the counter-substrate CT can be performed in parallel. In other words, this liquid crystal display device can be formed by using a conventional process of a vertical-electric-field mode liquid crystal display device, such as a TN mode liquid crystal display device. Therefore, there is no need to additionally install or largely reassemble the manufacturing line, and an increase in manufacturing cost can be suppressed.

Further, in this liquid crystal display device, since the counter-electrode ET is formed on the counter-substrate CT, it is possible to dispose, as described above, the second major electrode portion ETa, which is the counter-electrode ET, to be opposed to the signal line X.

In the conventional structure in which the pixel electrode and the counter-electrode are disposed on the same substrate, the pixel electrode and the counter-electrode are, in many cases, disposed on the inside of neighboring signal lines X. In this case, the region between the pixel electrode and the counter-electrode becomes an aperture portion which mainly contributes to display.

On the other hand, in the above-described structure in which the pixel electrode EP and counter-electrode ET are disposed on the different substrates, it is possible to dispose, in the pixel PX, the second major electrode portion ETa of the counter-electrode ET to be opposed to the signal line X. In this case, the region between the signal line X and the first major electrode portion EPa becomes an aperture portion. In short, compared to the conventional structure, the aperture portion can be increased and the transmittance can be improved.

In addition, by disposing the second major electrode portion ETa to be opposed to the signal line X, it becomes possible to increase the distance between the first major electrode portion EPa and the second major electrode portion ETa, compared to the conventional structure, and a transverse electric field E1 in a direction, which is closer to the horizontal direction, can be produced. Therefore, the transmittance can be improved, compared to the conventional structure. Specifically, in the present embodiment, the transmittance can be improved, compared to the conventional structure, while the advantages of the conventional structure of, e.g. the IPS mode, such as low viewing angle dependency and wide viewing angle characteristics, are maintained.

When misalignment occurs between the array substrate AR and the counter-substrate CT, it is possible that a difference may occur in distance between the first major electrode portion EPa and the second major electrode portions ETa on both sides which sandwich the first major electrode portion EPa. However, since such misalignment occurs commonly to all pixels PX, the electric field distribution between the pixels PX does not vary, and the display of images is not affected.

By the way, as described above, the pixel electrode EP includes the first sub-electrode portion EPb in addition to the first major electrode portion EPa. This first sub-electrode portion EPb is electrically connected to one end of the first major electrode portion EPa. The first sub-electrode portion EPb, as shown in FIG. 3, is formed in a trapezoidal shape, and a short side of the two parallel sides is disposed to be connected to the one end of the first major electrode portion EPa. Two oblique sides, which connect the short side and long side, are line-symmetric with respect to the center line that is parallel to the column direction. In addition, the first sub-electrode portion EPb is disposed equidistant from two signal lines X which sandwich the first sub-electrode portion EPb.

Figure 5:
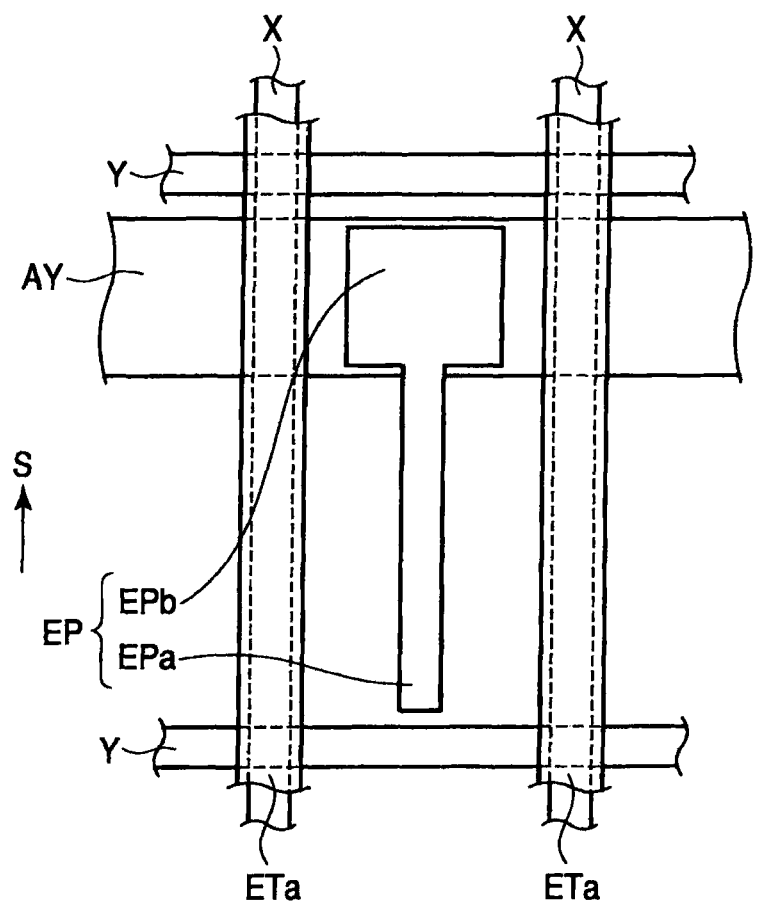
FIG. 5 is a plan view that schematically shows the structure of one pixel of a liquid crystal display device according to a first comparative example.

FIG. 5 shows a first comparative example. In the first comparative example, too, the pixel electrode EP includes a first sub-electrode portion EPb in addition to a first major electrode portion EPa. This first sub-electrode portion EPb is electrically connected to one end of the first major electrode portion EPa. In the first comparative example, the first sub-electrode portion EPb is formed in a rectangular shape, and the first sub-electrode portion EPb is disposed equidistant from two signal lines X which sandwich the first sub-electrode portion EPb.

In the embodiment shown in FIG. 3 and in the first comparative example, at the time of voltage application, a transverse electric field E1 is generated between the first major electrode portion EPa and the second major electrode portion ETa, and an electric field. E2 is generated between the first sub-electrode portion EPb and the second major electrode portion ETa. Thus, the electric field E2 is generated in addition to the transverse electric field E1 that is necessary for image display.

Figure 6:
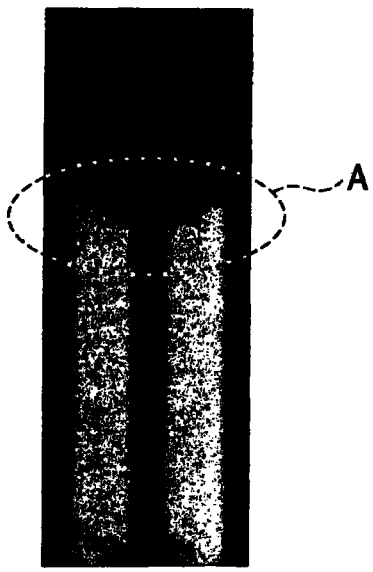
FIG. 6 shows a simulation result of an alignment direction of liquid crystal molecules at a time of voltage application in the embodiment.
Figure 7:
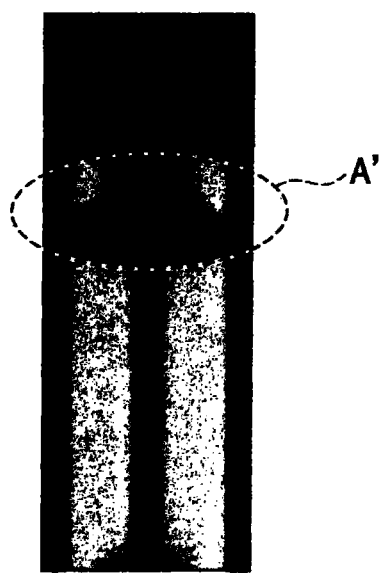
FIG. 7 shows a simulation result of an alignment direction of liquid crystal molecules at a time of voltage application in the first comparative example.

FIG. 6 shows a simulation result of an alignment direction of liquid crystal molecules at a time of voltage application in the present embodiment, and FIG. 7 shows a simulation result of an alignment direction of liquid crystal molecules at a time of voltage application in the first comparative example. In a region A and a region A', the liquid crystal molecules are affected by the transverse electric field E1 that is generated between the first major electrode portion EPa and the second major electrode portion ETa, and by the electric field E2 that is generated between the first sub-electrode portion EPb and the second major electrode portion ETa, and the liquid crystal molecules are aligned in a direction different from the alignment direction for white display. Consequently, in the region A and region A', the transmittance is low and a dark line occurs. If such a dark line occurs in the aperture portion, the transmittance undesirably lowers.

According to the present embodiment, since the trapezoidal first sub-electrode portion EPb is adopted, the interaction between the transverse electric field E1 and electric field E2 is relaxed, and the dark line appearing in the aperture portion can be decreased. As shown in FIG. 6 and FIG. 7, the area of occurrence of the dark line is smaller in the region A than in the region A'. Hence, as in the present embodiment, by forming the first sub-electrode portion EPb in the trapezoidal shape, the transmittance can be improved. According to the simulation that was conducted by the inventor, it was confirmed that the transmittance in the present embodiment was increased by about 4%, compared to the first comparative example.

Figure 8:
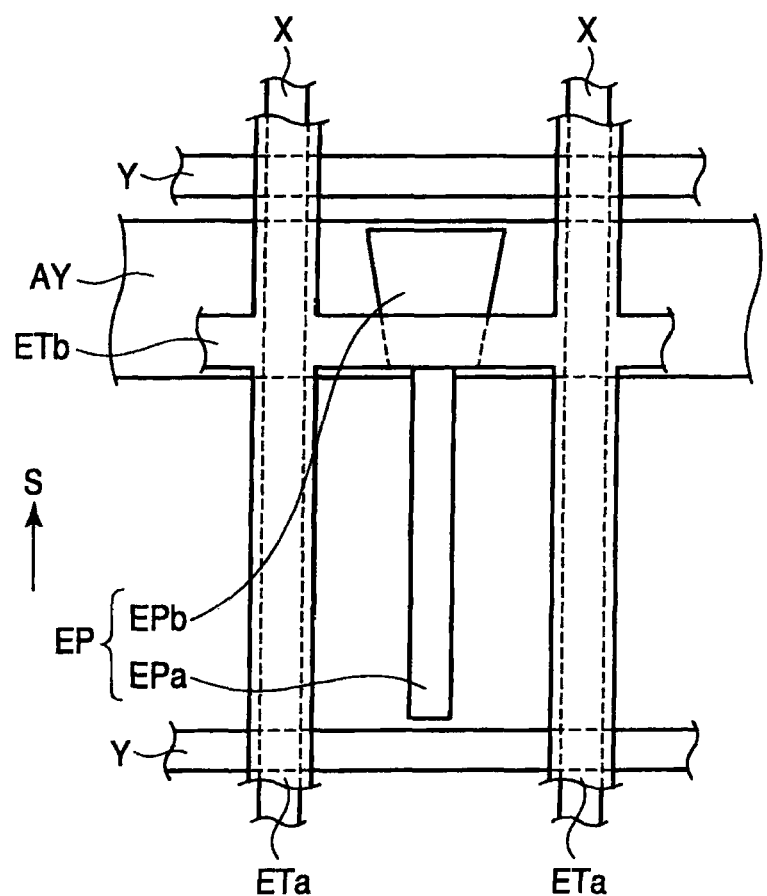
FIG. 8 is a plan view that schematically shows the structure of one pixel of a liquid crystal display device according to a modification of the embodiment.

FIG. 8 shows a modification of the present embodiment. In the modification, the counter-electrode ET further includes a second sub-electrode portion ETb. The second sub-electrode portion ETb is disposed to be opposed to the first sub-electrode portion EPb so as to produce a vertical electric field between the second sub-electrode portion ETb and the first sub-electrode portion EPb. In particular, in the example shown in FIG. 8, the second sub-electrode portion ETb is disposed on the boundary side between the first major electrode portion EPa and the first sub-electrode portion EPb.

In addition, the second sub-electrode portion ETb is disposed in the row direction in a manner to cross the second major electrode portions ETa, and is electrically connected to the second major electrode portions ETa. In the illustrated example, the second major electrode portions ETa and the second sub-electrode portion ETb are integrally formed of the same material.

According to the modification with this structure, at the time of voltage application, a vertical electric field E3 is formed between the first sub-electrode portion EPb and the second sub-electrode portion ETb, in addition to the above-described transverse electric field E1 and electric field E2.

Figure 9:
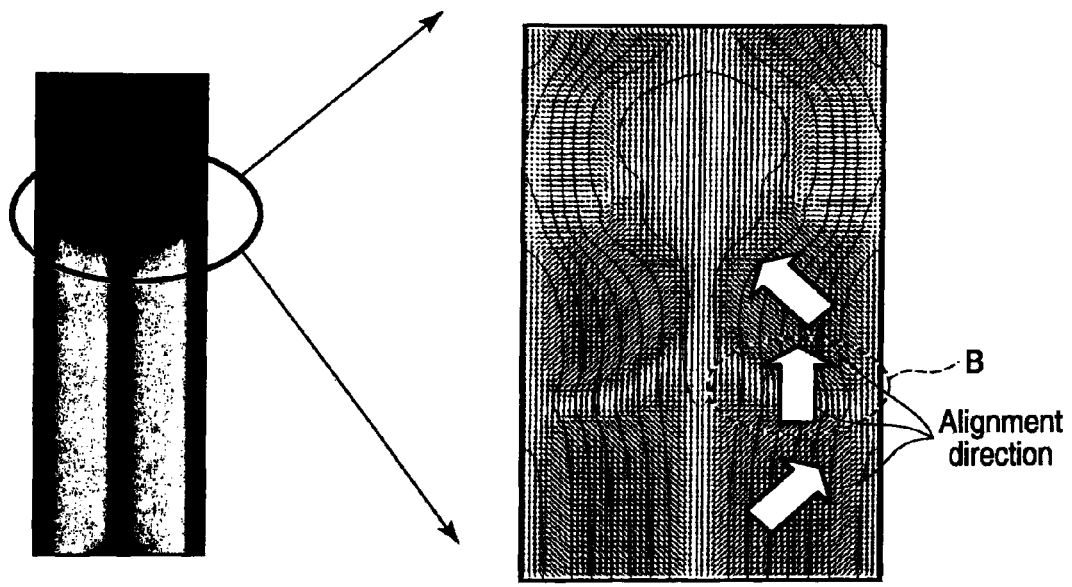
FIG. 9 shows a simulation result of the relationship between an equipotential surface and an alignment direction of liquid crystal molecules at a time of voltage application in the embodiment.
Figure 10:
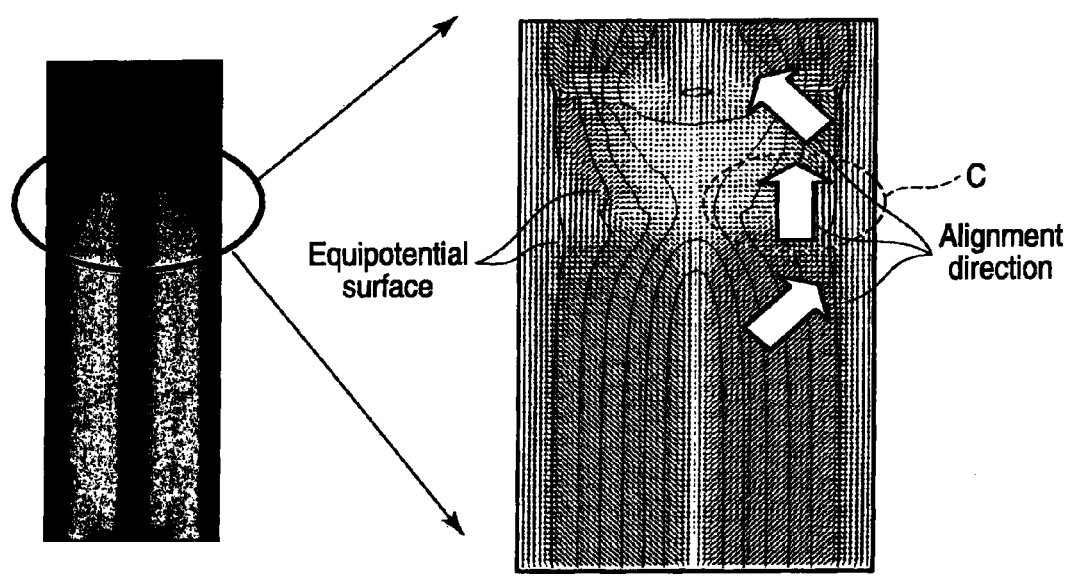
FIG. 10 shows a simulation result of the relationship between an equipotential surface and an alignment direction of liquid crystal molecules at a time of voltage application in the modification.

FIG. 9 and FIG. 10 show simulation results of the relationship between an equipotential surface and an alignment direction of liquid crystal molecules at a time of voltage application in the embodiment shown in FIG. 3 and the modification shown in FIG. 8.

As shown in FIG. 9, in a region B, a dark like occurs due to the influence of the transverse electric field E1 and electric field E2.

On the other hand, as shown in FIG. 10, in the modification, the liquid crystal molecules are affected by the transverse electric field E1, electric field E2 and vertical electric field E3 in a region C. In the region C, the transmittance is low, and a dark line occurs.

At this time, the region C is formed on a light-blocking portion by the interaction between the electric field E2 and vertical electric field E3. Specifically, since the region B is formed in the aperture portion, the region B contributes to image display, and causes a decrease in transmittance. On the other hand, the region C is formed on the storage capacitance line AY that is formed of the light-blocking material, and does not contribute to image display.

Specifically, since the dark line is shifted onto the light-blocking portion, the transmittance can be improved. It was confirmed that the transmittance in the modification shown in FIG. 8 was increased by about 7%, compared to the present embodiment shown in FIG. 6.

Figures 11, 12:
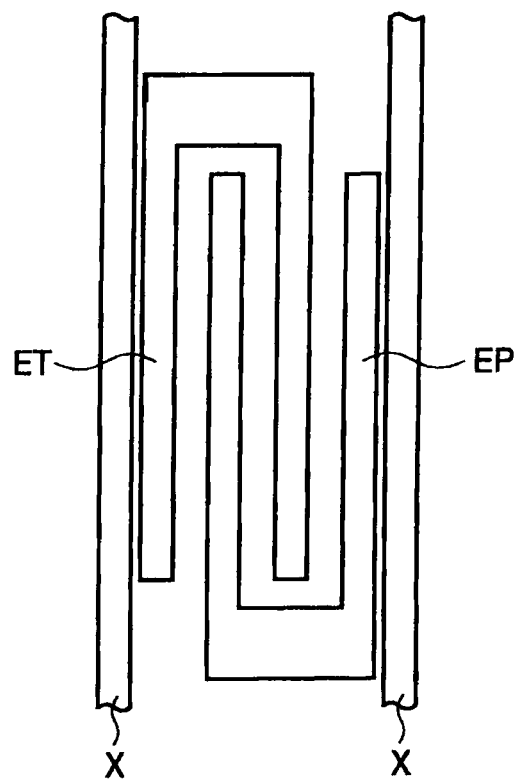
FIG. 11 is a plan view that schematically shows the structure of one pixel of a liquid crystal display device according to a second comparative example.
FIG. 12 shows a verification result of the effect that is obtained by disposing a pixel electrode and a counter-electrode on different substrates in a transverse electric field mode.

Next, in order to verify the advantageous effect of the modification, a description is given of a second comparative example for comparison with the modification. The second comparative example shown in FIG. 11 is a liquid crystal display device which is configured to operate in a liquid crystal mode which uses a transverse electric field. This liquid crystal display device includes a pixel electrode EP and a counter-electrode ET between a pair of signal lines X on the array substrate AR.

The transmittance was measured with respect to the modification shown in FIG. 8 and the second comparative example shown in FIG. 11. FIG. 12 shows the result of measurement. When the transmittance in the second comparative example at the time of application of a maximum voltage (i.e. at the time of displaying a white screen) was set at 1.00, the transmittance in the modification at the time of applying the same voltage was 1.15.

As has been described above, according to the liquid crystal display device of the present embodiment, the manufacturing cost can be suppressed, the viewing angle dependency is low, wide viewing angle characteristics are obtained, the transmittance can be improved, and an image with good display quality can be displayed.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

In the example shown in FIG. 3, etc., in each pixel PX, the pixel electrode EP includes a single first major electrode portion EPa, but the pixel electrode EP may include a plurality of first major electrode portions EPa. In an example shown in FIG. 13, in each pixel PX, the pixel electrode EP includes two first major electrode portion EPa. In this case, the second major electrode portion ETa is disposed between two first major electrode portions EPa. Specifically, the first major electrode portions EPa and second major electrode portions ETa are alternately arranged in parallel in a combtooth pattern. In this case, the distance between each first major electrode portion EPa and each second major electrode portion ETa is substantially equally set. In this example, too, the same advantageous effects as in the above-described embodiment can be obtained.

The modification shown in FIG. 8 relates to the liquid crystal display device using the trapezoidal first sub-electrode portion EPb. In the case where the second sub-electrode portion ETb is disposed, the shape of the storage capacitance portion is not particularly limited. For example, even with a liquid crystal display device using a rectangular first sub-electrode portion EPb, the same advantageous effects as in the modification can be obtained.

What is claimed is:

1. A liquid crystal display device comprising:
an array substrate comprising
a storage capacitance line extended in a row direction; and
a pixel electrode which is disposed in each of pixels, the pixel electrode comprising:
a first major electrode portion having a strip shape extended in a column direction; and
a first subelectrode portion which is positioned above the storage capacitance line and is electrically connected to the first major electrode portion;
a counter-substrate which is disposed to be opposed to the array substrate and comprises a counter-electrode which is common to the pixels, the counter-electrode comprising second major electrode portions each having a strip shape and a second sub-electrode portion; and
a liquid crystal layer which is held between the array substrate and the counter-substrate,
wherein:
the second major electrode portions are disposed in parallel to the first major electrode portion in a manner that the first major electrode portion is interposed between the second major electrode portions; and
the second sub-electrode portion is opposed to the first sub electrode portion and is electrically connected to the second major electrode portion.

2. The liquid crystal display device according to claim 1, wherein:
the array substrate further comprises signal lines which are disposed along the column direction; and the first sub-electrode portion is disposed equidistant from two signal lines which sandwich the first sub-electrode portion.

3. The liquid crystal display device according to claim 1, wherein the second subelectrode portion is disposed on the boundary side between the first major electrode portion and the first sub-electrode portion.

4. The liquid crystal display device according to claim 1, wherein:
   the array substrate further comprises a first alignment film covering the pixel electrode;
   the counter-electrode further comprises a second alignment film covering the counter-electrode; and
   a first rubbing direction of the first alignment film and a second rubbing direction of the second alignment film are parallel to the column direction.

5. A liquid crystal display device comprising:
   an array substrate comprising
      a storage capacitance line extended in a row direction; and
      a pixel electrode which is disposed in each of pixels, the pixel electrode comprising:
         first major electrode portions each having a strip shape extended in a column direction; and
         a first sub-electrode portion which is positioned above the storage capacitance line and is electrically connected to the first major electrode portions;
   a counter-substrate which is disposed to be opposed to the array substrate and comprises a counter-electrode which is common to a plurality of the pixels, the counter-electrode comprising second major electrode portions each having a strip shape and a second sub-electrode portion; and
   a liquid crystal layer which is held between the array substrate and the counter-substrate,
   wherein
      the second major electrode portions are disposed in parallel to the first major electrode portions in a manner that each of the first major electrode portions is interposed between the second major electrode portions and that the first major electrode portion and the second major electrode portion are alternately arranged, and
      the second sub-electrode portion is opposed to the first sub electrode portion and is electrically connected to the second major electrode portion.

6. The liquid crystal display device according to claim 5, wherein:
   the array substrate further comprises signal lines which are disposed along the column direction; and
   the first sub-electrode portion is disposed equidistant from two signal lines which sandwich the first sub-electrode portion.

7. The liquid crystal display device according to claim 5, wherein the second subelectrode portion is disposed on the boundary side between the first major electrode portions and the first sub-electrode portion.

8. The liquid crystal display device according to claim 5, wherein:
   the array substrate further comprises a first alignment film covering the pixel electrode;
   the counter-electrode further comprises a second alignment film covering the counter-electrode; and
   a first rubbing direction of the first alignment film and a second rubbing direction of the second alignment film are parallel to the column direction.

9. A liquid crystal display device comprising:
   an array substrate comprising a pixel electrode which is disposed in each of pixels, the pixel electrode comprising
      a first major electrode portion having a strip shape extended in a column direction; and
      a rectangular first sub-electrode portion which is electrically connected to the first major electrode portion;
   a counter-substrate which is disposed to be opposed to the array substrate and comprises a counter-electrode which is common to a plurality of the pixels, the counter-electrode comprising second major electrode portions each having a strip shape and a second sub-electrode portion; and
   a liquid crystal layer which is held between the array substrate and the counter-substrate,
   wherein:
      the second major electrode portions are disposed in parallel to the first major electrode portion in a manner that the first major electrode portion is interposed between the second major electrode portions, and
      the second sub-electrode portion is opposed to the first sub electrode portion and is electrically connected to the second major electrode portion.

10. The liquid crystal display device according to claim 9, wherein the array substrate further comprises signal lines which are disposed along the column direction; and
   the first sub-electrode portion is disposed equidistant from two signal lines which sandwich the first sub-electrode portion.

11. The liquid crystal display device according to claim 9, wherein the second subelectrode portion is disposed on the boundary side between the first major electrode portion and the first sub-electrode portion.

12. The liquid crystal display device according to claim 9, wherein:
   the array substrate further comprises a first alignment film covering the pixel electrode;
   the counter-electrode further comprises a second alignment film covering the counter-electrode; and
   a first rubbing direction of the first alignment film and a second rubbing direction of the second alignment film are parallel to the column direction.

* * * * *